Figure 1:
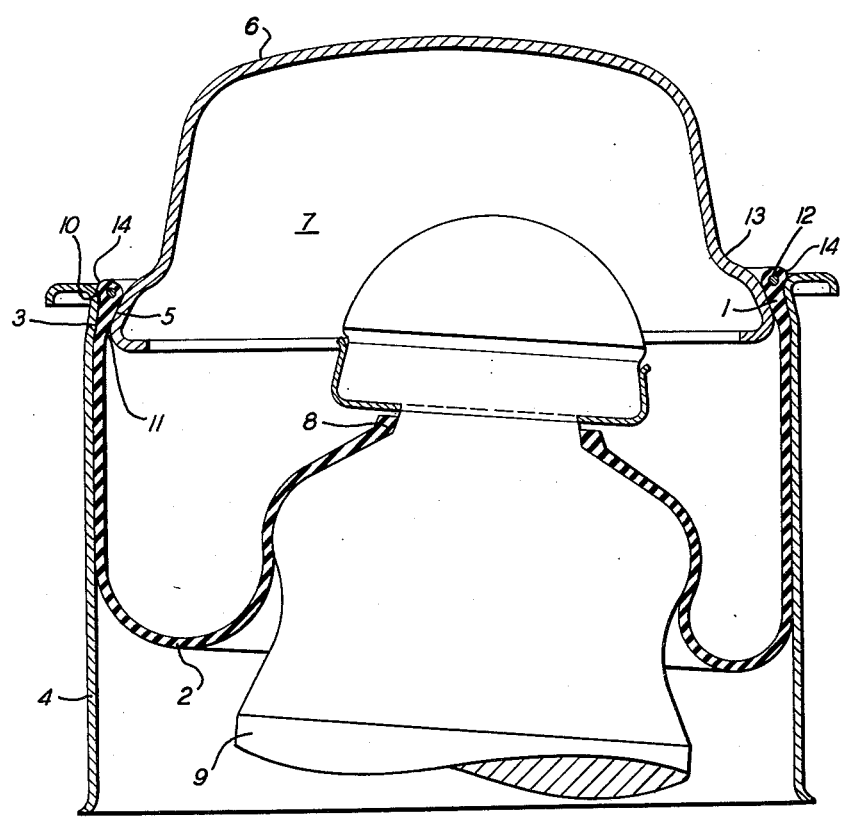

Sept. 11, 1962   A. STENGELIN   3,053,528
PNEUMATIC SPRING ARRANGEMENT
Filed April 20, 1959

INVENTOR.
ADOLF STENGELIN
BY
Dickes, Craig and Freudenberg
ATTORNEYS

United States Patent Office 3,053,528
Patented Sept. 11, 1962

3,053,528
PNEUMATIC SPRING ARRANGEMENT
Adolf Stengelin, Stuttgart, Germany, assignor to Daimler-Benz Aktiengesellschaft, Stuttgart-Unterturkheim, Germany
Filed Apr. 20, 1959, Ser. No. 807,507
Claims priority, application Germany Apr. 22, 1958
6 Claims. (Cl. 267—65)

The present invention relates to a securing arrangement for the free outer rim portion of a roller-type bellows of pneumatic springs, especially for motor vehicles which takes place in such a manner that the wedge-shaped, reinforced rim portion of the bellows is clamped between two concentrically disposed and conically extending annular zones formed by two securing parts.

It is already known with pneumatic spring elements of motor vehicles of the prior art which consist of a lower and of an upper roller-type bellows connected with one another by means of a rigid sleeve member to secure the outer rims of the upper and lower roller-type bellows between the outer surfaces disposed at both ends of the connecting sleeve member mentioned hereinabove, on the one hand, and a second sleeve member arranged concentrically with respect to the first-mentioned sleeve member and having a larger diameter than the first-mentioned sleeve member, on the other, and, more particularly, in such a manner that a threaded ring is threadably mounted on the second outwardly disposed sleeve member which spreads both parts in the axial direction and thereby clamps the outer ends of the roller-type bellows. Consequently, in these prior art constructions, the outer rim portion of one roller-type bellows is retained, on the one hand, by the outer surface at the one end of the inner sleeve member and by the inner surface of the one end of the outer sleeve member whereas the outer rim portion of the other roller-type bellows is clamped, on the other, by the outer surface at the other end of the inner sleeve member and the inner surface of the end of the threaded ring.

This prior art construction entails the disadvantage that with an excessive tightening of the threaded ring, the outer rim portions of both roller-type bellows may be readily damaged and, furthermore, an additional machined element, such as the threaded ring is necessary for purposes of achieving the securing together of the various parts so that a relatively expensive construction results therefrom.

Furthermore, it is already known in the prior art to construct the outer rim portion of the roller-type bellows in a wedge-shaped manner and to clamp the same between two conical annular zones of which one annular zone, namely the outer, inwardly directed annular zone is formed by a separate annular or ring member having a wedge-shaped cross section which is secured at the inner wall of the housing of the pneumatic spring element in turn rigidly secured to the vehicle whereas the other outwardly directed annular zone is formed by a separate machined part, for example, a securing ring member also having a wedge-shaped cross section.

The last-described prior art construction also has the disadvantage that at least one further machined part which does not belong to the pneumatic spring element as such is necessary for locating and securing the outer rim portion of the roller-type bellows whereby the construction is again rendered more expensive. Additionally, difficulties occur with such constructions during the disassembly thereof by reason of the fact that the inner securing ring is not readily accessible in order to lift the same and therewith disengage the clamp-type connection.

The present invention is principally concerned with the problem to produce, with the simplest possible means, a safe securing of the outer rim portion of a roller-type bellows. The present invention is characterized by the fact that, departing with an arrangement to clamp the reinforced rim portion of the roller-type bellows between two concentrically disposed and conically extending annular zones constituted by corresponding securing parts, these annular zones are formed in accordance with the present invention exclusively by structural elements forming part of the pneumatic spring as such. Among these structural parts of the pneumatic spring as such are included elements which are also functionally constituent parts of the pneumatic spring. In other words, the term "structural parts of the pneumatic spring itself" refers to those parts which are component parts of the pneumatic spring from a functional point of view.

Pneumatic springs with roller-type bellows consist, in many instances, inter alia, of an outer guide sleeve member which retains the bellows laterally and protects the same against damages, and of an open housing rigidly connected with the vehicle superstructure such as the vehicle, body, chassis or frame which constitutes the upper part of the air chamber, whereas the lower part thereof is formed by the roller-type bellows and the concentrically arranged displacement member which is operatively connected with a wheel guiding or wheel suspension member.

According to a further feature in accordance with the present invention, and utilizing a structural assembly of a pneumatic spring as mentioned hereinabove, the outer, inwardly pointing annular zone is formed by the upper rim section of the guide sleeve and the inner, outwardly pointing annular zone is formed by the lower rim section of the housing of the air chamber rigidly connected with the vehicle.

The aforementioned annular zones are produced in an advantageous manner according to the present invention already at the same time as the manufacture of these parts, namely during the manufacture of the guide sleeve and of the housing rigidly connected with the vehicle whereby such manufacture may be realized in any suitable manner, for example, by deep drawing or rolling.

Accordingly, it is an object of the present invention to provide a securing arrangement for a roller-type bellows of a pneumatic spring which obviates the disadvantages of the prior art constructions.

Another object of the present invention resides in the provision of a securing arrangement for a roller-type bellows of a pneumatic spring which assures a safe securing with the simplest possible means while at the same time protecting the pneumatic spring against damages and eliminating additional, specially machined parts.

A further object of the present invention is to provide a reliable and safe securing of a roller-type bellows of a pneumatic spring for motor vehicles which is very simple in construction, reliable in operation and relatively inexpensive in manufacture and assembly.

Still another object of the present invention resides in the arrangement of a securing means for a roller-type bellows of pneumatic spring which permits ready disassembly of the pneumatic spring.

Figure 2:
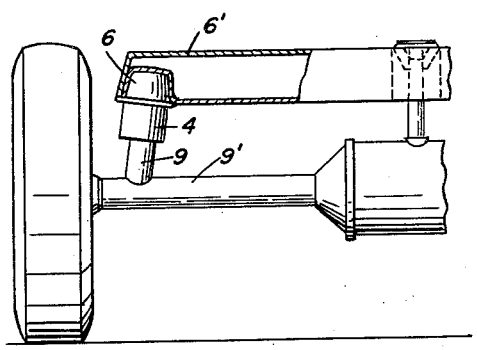

These and other objects, features and advantages of the present invention will become more obvious from the following description when taken in connection with the accompanying drawing which shows, for purposes of illustration only, in FIGURE 1 a cross-sectional view through one embodiment in accordance with the present invention and in FIGURE 2 a schematic view illustrating the general arrangement of the device in accordance with the present invention.

Referring now to FIGURE 1 of the drawing which is a cross sectional view through one embodiment of a pneumatic spring assembly in accordance with the present invention, reference numeral 1 designates therein the reinforced outer rim portion of essentially wedge-shaped cross section of the roller-type bellows 2. The wedge-shaped, reinforced outer rim portion 1 of the roller-type bellows 2 is thereby clamped between an outer annular zone 3 formed by the guide sleeve 4 and an inner annular zone 5 formed by the housing 6 which itself forms part of or is rigidly connected with a relatively stationary vehicle part 6' such as the superstructure, body, chassis or frame of the vehicle as illustrated in FIGURE 2. Both annular zones 3 and 5 extend essentially conically whereby the angle of opening of the cone of the outer ring zone 3 is more acute than the angle of opening of the cone of the inner annular zone 5. An absolutely rigid, secure and air-tight seating of the wedge-shaped outer rim portion 1 of bellows 2 is assured by reason of the relatively large pressure in excess of the atmospheric pressure which normally prevails in the air chamber 7. The inner rim portion 8 of the roller-type bellows 2 is secured in any suitable manner at the displacement body member 9 which itself is operatively connected with parts of the wheel guide means 9' or vehicle wheel suspension as illustrated in FIGURE 2.

The smallest diameter at the place 10 of the annular zone 3 is larger than the largest diameter at the place 11 of the annular zone 5 plus the wall thickness of the roller-type bellows 2.

This particular arrangement of the diametric dimensions is of significant advantage during disassembly. During disassembly, the guide sleeve 4 is pushed upwardly together with the outer rim 1 whereupon it becomes possible thereafter to take off or slip off the guide sleeve 4 in a downward direction. The wedge-shaped outer rim portion 1 provided with a center web or core 12 which is non-flexible or non-elastic is thereupon pushed upwardly and inwardly on one side of the assembly following the recessed or inwardly offset portion 13 of the housing 6 rigidly secured to the vehicle so that it may be stripped off downwardly beyond the place 11 on the other side thereof. This disassembly operation has some similarity with the mounting of a tire on a drop-center rim of wheels.

The outer rim portion 1 is provided along the upper part thereof with an outwardly pointing relatively slightly bulged portion 14 in order to prevent in a safe reliable manner any shaking-loose of the guide sleeve 4 during driving operations.

Not only the manufacture of a pneumatic spring element if simplified and thereby rendered less expensive by the present invention but also favorable disassembly conditions are created and therewith a safe and effective securing of the outer rim portion of roller-type bellows is achieved.

While I have shown and described one embodiment in accordance with the present invention it is understood that the same is not limited thereto but is susceptible of many changes and modifications within the spirit and scope of the present invention, and I, therefore, do not wish to be limited to the details described herein but intend to cover all such changes and modifications as are encompassed within the scope of the appended claims.

I claim:

1. A securing arrangement for readily force securing the outer rim portion of a roller-type bellows of pneumatic springs, especially for motor vehicles, without bolts, screws, or other mechanical aids, comprising a relatively stationary vehicle part, bellows means having a wedge-shaped reinforced rim portion, and securing means consisting of two concentrically arranged conically extending annular zones for clamping therebetween said rim portion, said securing means being formed exclusively by structural parts of the pneumatic spring itself, one of said parts being constituted by a guide sleeve member for retaining and protecting said bellows means laterally, and another part being constituted by a hood-shaped housing member rigidly connected with said relatively stationary part, said hood-shaped housing member being spaced from said bellows means and forming therewith the air chamber of the pneumatic spring, said guide sleeve member including an outer inwardly-pointing annular rim section at one end thereof forming one of said zones, and said housing including an inner outwardly-pointing annular rim section forming the other of said zones, the angle of opening of the cone of the outer annular zone being more acute than the angle of opening of the cone of the inner annular zone.

2. A securing arrangement for readily securing the outer rim portion of a roller-type bellows of pneumatic springs according to claim 1, wherein the apexes of the cones forming said conically extending annular zones are directed upwardly.

3. A securing arrangement for readily securing the outer rim portion of a roller-type bellows of pneumatic springs according to claim 2, wherein the smallest inner diameter of said outer annular zone is larger than the largest outer diameter of the inner annular zone plus the wall thickness of said air bellows means.

4. A securing arrangement for readily securing the outer rim portion of a roller-type bellows of pneumatic springs, especially for motor vehicles, comprising a relatively stationary vehicle part, bellows means having a wedge-shaped reinforced rim portion, and securing means constituting two concentrically arranged conically extending annular zones for clamping therebetween said rim portion, the apexes of the cones forming said conically extending annular zones being directed upwardly, the smallest inner diameter of the outer annular zone being larger than the largest outer diameter of the inner annular zone plus the wall thickness of said air bellows means, said securing means being formed exclusively by structural parts of the pneumatic spring itself, one of said parts being constituted by the guide sleeve member for retaining and protecting said bellows means laterally, and another part being constituted by a hood-shaped housing member rigidly connected with said relatively stationary part, said hood-shaped housing member being spaced from said bellows means and forming therewith the air chamber of the pneumatic spring, said guide sleeve member including an outer inwardly-pointing annular rim section at one end thereof forming one of said zones, said housing including an inner outwardly-pointing annular rim section forming the other of said zones, the angle of opening of the cone of the outer annular zone being more acute than the angle of opening of the cone of the inner annular zone, said hood-shaped housing member being provided with an inwardly offset portion directly adjacent the upper annular zone.

5. A securing arrangement for readily securing the outer rim portion of a roller-type bellows of pneumatic springs according to claim 4, wherein said outer rim portion is provided with a relatively slight outwardly-directed bulge means.

6. A securing arrangement for readily securing the outer rim portion of a roller-type bellows of pneumatic springs, especially for motor vehicles, comprising a relatively stationary vehicle part, bellows means having a wedge-shaped reinforced rim portion, said rim portion being provided with a relatively slight outwardly-directed bulge means, and securing means constituting two concentrically arranged conically extending annular zones for clamping therebetween said rim portion, the apexes of the cones forming said conically extending annular zones being directed upwardly, the smallest inner diameter of said outer annular zone being larger than the largest outer diameter of the inner annular zone plus the wall thickness of said air bellows means, said securing means being formed exclusively by structural parts of the pneumatic spring itself, one of said parts being constituted by a guide sleeve member for retaining and protecting said bellows means laterally, and another part being constituted by a hood-shaped housing member rigidly connected with said relatively stationary part, said hood-shaped housing member being spaced from said bellows means and forming therewith the air chamber of the pneumatic spring, said guide sleeve member including an outer inwardly-pointing annular rim section at one end thereof forming one of said zones and said housing including an inner outwardly-pointing annular rim section forming the other of said zones, the angle of opening of the cone of the outer annular zone being more acute than the angle of opening of the cone of the inner annular zone.

References Cited in the file of this patent

UNITED STATES PATENTS

| | | |
|---|---|---|
| 4,965 | Lewis | Feb. 10, 1847 |
| 2,317,073 | Martin | Apr. 20, 1943 |
| 2,567,071 | Jacobus | Sept. 4, 1951 |
| 2,842,359 | Auer | July 8, 1958 |